(12) United States Patent  
Bendersky et al.

(10) Patent No.: US 12,141,214 B2  
(45) Date of Patent: Nov. 12, 2024

(54) ADVERSARIAL BANDITS POLICY FOR CRAWLING HIGHLY DYNAMIC CONTENT

(71) Applicant: GOOGLE LLC, Mountain View, CA (US)

(72) Inventors: Michael Bendersky, Cupertino, CA (US); Przemysław Gajda, Zurich (CH); Sergey Novikov, Zurich (CH); Marc Alexander Najork, Palo Alto, CA (US); Shuguang Han, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 19 days.

(21) Appl. No.: 17/995,248

(22) PCT Filed: Mar. 30, 2020

(86) PCT No.: PCT/US2020/025757  
§ 371 (c)(1),  
(2) Date: Sep. 30, 2022

(87) PCT Pub. No.: WO2021/201825  
PCT Pub. Date: Oct. 7, 2021

(65) Prior Publication Data  
US 2023/0169128 A1 Jun. 1, 2023

(51) Int. Cl.  
*G06F 16/951* (2019.01)  
*G06F 18/214* (2023.01)  
(Continued)

(52) U.S. Cl.  
CPC .......... *G06F 16/951* (2019.01); *G06F 18/214* (2023.01); *G06Q 30/0239* (2013.01); *G06Q 30/0601* (2013.01)

(58) Field of Classification Search  
CPC .... G06F 16/951; G06F 16/953; G06F 16/957; G06F 16/972; G06F 16/9532;  
(Continued)

(56) References Cited

U.S. PATENT DOCUMENTS

| | | | |
|---|---|---|---|
| 11,392,840 B2* | 7/2022 | Santhanam | G06Q 30/0631 |
| 2020/0372084 A1* | 11/2020 | Kolobov | G06F 9/4881 |
| 2022/0058701 A1* | 2/2022 | Fuchs | G06Q 30/0283 |

OTHER PUBLICATIONS

International Search Report and Written Opinion for PCT Application No. PCT/US2020/025757, mailed on Nov. 3, 2020, 13 pages.  
(Continued)

*Primary Examiner* — Marcin R Filipczyk  
(74) *Attorney, Agent, or Firm* — Brake Hughes Bellermann LLP

(57) ABSTRACT

Techniques of generating recrawl policies for commercial offer pages include generating a multiple strategy approach using a number of different strategies. In some implementations, each strategy is an arm of a K-armed adversarial bandits algorithm with reinforcement learning. Moreover, in some implementations, the multiple strategy approach also uses a machine learning algorithm to estimate parameters such as a click rate, impression rate, and likelihood of price change, i.e., change rate, which was assumed known in the conventional approaches.

18 Claims, 7 Drawing Sheets

(51) Int. Cl.
    G06Q 30/0207    (2023.01)
    G06Q 30/0601    (2023.01)
(58) Field of Classification Search
    CPC .............. G06F 16/9538; G06F 18/214; G06Q 30/0239; G06Q 30/0601; G06N 20/00; G06N 20/20
    See application file for complete search history.

(56) References Cited

OTHER PUBLICATIONS

Abadi, et al., "Tensorflow: A System for Large-Scale Machine Learning", in Proceedings of the 12th USENIX Symposium on Operating Systems Design and Implementation, Nov. 2-4, 2016, pp. 265-283.
Adar, et al., "The Web Changes Everything: Understanding the Dynamics of Web Content", in Proceedings of the 2nd ACM International Conference on Web Search and Data Mining, Feb. 9-12, 2009, pp. 282-291.
Ai, et al., "Learning a Hierarchical Embedding Model for Personalized Product Search", in Proceedings of the 40th International ACM SIGIR Conference on Research and Development in Information Retrieval, Aug. 7-11, 2017, pp. 645-654.
Allesiardo, et al., "The Non-Stationary Stochastic Multi-Armed Bandit Problem", CrossMark; Int J Data Sci Anal, 2017, pp. 267-283.
Auer, et al., "The Nonstochastic Multiarmed Bandit Problem", Society for Industrial and Applied Mathematics, vol. 32, No. 1, 2002, pp. 48-77.
Azar, et al., "Tractable Near-Optimal Policies for Crawling", Proceedings of the National Academy of Sciences, vol. 115, No. 32, Aug. 7, 2018, pp. 8099-8103.
Baeza-Yates, et al., "Balancing Volume, Quality and Freshness in Web Crawling", in Proceedings of the 2nd International Conference on Hybrid Intelligent Systems, 2002, pp. 565-572.
Brewington, et al., "How dynamic is the Web?", Computer Networks, vol. 33, Issue 1-6., Jun. 2000, pp. 257-276.
Bubeck, et al., "Regret Analysis of Stochastic and Nonstochastic Multi-armed Bandit Problems", Foundations and Trends in Machine Learning, vol. 5, No. 1, 2012, pp. 1-26.
Calzarossa, et al., "Characterization of the Evolution of a News Web Site", Journal of Systems and Software, vol. 31, No. 12, 2008, pp. 2336-2344.
Calzarossa, et al., "Modeling and Predicting Temporal Patterns of Web Content Changes", Journal of Network and Computer Applications, vol. 56, 2015, pp. 115-123.
Castillo, "Effective Web Crawling", ACM SIGIR Forum, vol. 39, No. 1, Jun. 2005, pp. 55-56.
Cho , et al., "Effective Change Detection Using Sampling", Proceedings of the 28th VLDB Conference, 2002, pp. 1-12.
Cho, et al., "Effective Page Refresh Policies for Web Crawlers", ACM Transactions on Database Systems, vol. 28, No. 4, Dec. 2003, pp. 1-36.
Cho, et al., "Efficient Crawling Through URL Ordering", Computer Networks and ISDN Systems, vol. 30, No. 1-7, 1998, pp. 161-172.
Cho, et al., "Estimating Frequency of Change", ACM Transactions on Internet Technology (TOIT), vol. 3, No. 3, Aug. 2003, pp. 256-290.
Cho, et al., "Synchronizing a Database to Improve Freshness", in Proceedings of the 2000 ACM SIGMOD International Conference on Management of Data, 2000, pp. 117-128.
Cho, et al., "The Evolution of the Web and Implications for an Incremental Crawler", in Proceedings of the 26th International Conference on Very Large Data Bases. Morgan Kaufmann Publishers, 2000, pp. 200-209.
Coffman, et al., "Optimal Robot Scheduling for Web Search Engines", Journal of scheduling, vol. 1, No. 1, 1998, pp. 15-29.
Cohen, et al., "Refreshment Policies for Web Content Caches", in IEEE INFOCOM13 The Conference on Computer Communications—Twentieth Annual Joint Conference of the IEEE Computer and Communications Societies, vol. 3., 2001, pp. 1398-1406.
Eckstein, et al., "Monitoring an Information Source Under a Politeness Constraint", INFORMS Journal on Computing, vol. 20, No. 1, 2008, pp. 3-20.
Edwards, et al., "An Adaptive Model for Optimizing Performance of an Incremental Web Crawler", in Proceedings of the 10th International World Wide Web Conference, May 1-5, 2001, pp. 106-113.
Fetterly, et al., "A Large-Scale Study of the Evolution of Web Pages", in Proceedings of the 12th International World Wide Web Conference, May 20-24, 2003, pp. 1-10.
Grimes, et al., "Keeping a Search Engine Index Fresh: Riskand Optimality in Estimating Refresh Rates for Web Pages", Proceedings of the 40th Symposium on the Interface: Computing Science and Statistics, 2008, pp. 1-14.
Han, "Predictive Crawling for Commercial Web Content", in The World Wide Web Conference, May 13-17, 2019, pp. 1-11.
Kolobov, et al., "Optimal Freshness Crawl Under Politeness Constraints", in Proceedings of the 42nd International ACM SIGIR Conference on Research and Development in Information Retrieval., Jul. 21-25, 2019, pp. 495-504.
Kolobov, et al., "Staying Up to Date with Online Content Changes Using Reinforcement Learning for Scheduling", in Reinforcement Learning for Real Life (RL4RealLife) Workshop in the 36th International Conference on Machine Learning, 2019, pp. 1-25.
Lefortier, et al., "Timely Crawling of High-quality Ephemeral New Content", in Proceedings of the 22nd ACM International Conference on Information & Knowledge Management, Oct. 27-Nov. 1, 2013, pp. 745-750.
Li, et al., "A Contextual-Bandit Approach to Personalized News Article Recommendation", in Proceedings of the 19th International conference on World wide web, Apr. 26-30, 2010, pp. 1-10.
Li, et al., "Temporal Update Dynamics Under Blind Sampling", IEEE/ACM Transactions on Networking (TON), vol. 25, No. 1, 2017, pp. 363-376.
McCallum, et al., "A Machine Learning Approach to Building Domain-Specific Search Engines", International Joint Conferences on Artificial Intelligence, vol. 99, 1999, pp. 662-667.
McMahan, et al., "Ad Click Prediction: a View from the Trenches", in Proceedings of the 19th ACM SIGKDD International conference on Knowledge discovery and data mining, Aug. 11-14, 2013, pp. 1-9.
Mikolov, et al., "Efficient Estimation of Word Representations in Vector Space", http://arxiv.org/abs/1301.3781, Sep. 7, 2013, pp. 1-12.
Najork, et al., "High-Performance Web Crawling", SRC Research Report, Compaq System Research Center, Sep. 26, 2001, 25 pages.
Neu , et al., "Explore No More: Improved High-Probability Regret Bounds for Non-Stochastic Bandits", in Advances in Neural Information Processing Systems, Nov. 3, 2015, pp. 3168-3176.
Olston, et al., "Recrawl Scheduling Based on Information Longevity", in Proceedings of the 17th International Conference on World Wide Web, Apr. 21-25, 2008, pp. 437-446.
Olston, et al., "Web Crawling", Foundations and Trends® in Information Retrieval, vol. 4, No. 3, 2010, pp. 175-246.
Radinsky, et al., "Predicting Content Change on the Web", in Proceedings of the Sixth ACM International Conference on Web Search and Data Mining, Feb. 4-8, 2012, pp. 415-424.
Rennie, et al., "Using Reinforcement Learning to Spider the Web Efficiently", in International Conference on Machine Learning, vol. 99, 1999, pp. 335-343.
Romer, et al., "Real-Time Search for Real-World Entities: a Survey", Proc. IEEE, vol. 98, No. 11, 2010, pp. 1887-1902.
Seldin, et al., "An Improved Parametrization and Analysis of the EXP3++ Algorithm for Stochastic and Adversarial Bandits", Proceedings of Machine Learning Research, vol. 65, 2017, pp. 1-17.
Tan, et al., "Clustering-Based Incremental Web Crawling", ACM Transactions on Information Systems, vol. 28, No. 4, Article 17, Nov. 2010, pp. 1-17.

(56) References Cited

OTHER PUBLICATIONS

Tan, et al., "Efficiently Detecting Webpage Updates Using Samples", in International Conference on Web Engineering. 2007, pp. 285-300.
Upadhyay, et al., "Learning to Crawl", arXiv preprint arXiv: 1905.12781, 2019, pp. 6046-6053.
Wolf, et al., "Optimal Crawling Strategies for Web Search Engines", in Proceedings of the 11th International Conference on World Wide Web, May 7-11, 2002, pp. 136-147.
Wu, et al., "Predicting Latent Structured Intents from Shopping Queries", in Proceedings of the 26th International Conference on World Wide Web, Apr. 3-7, 2017, pp. 1133-1141.

\* cited by examiner

ADVERSARIAL BANDITS POLICY FOR CRAWLING HIGHLY DYNAMIC CONTENT

CROSS REFERENCE TO RELATED APPLICATION

This application is a 35 U.S.C. § 371 National Phase Entry Application from PCT/US2020/025757, filed Mar. 30, 2020, designating the U.S., the disclosure of which is incorporated herein by reference in its entirety.

TECHNICAL FIELD

This description relates to generating web recrawling policies for highly dynamic content, such as webpages.

BACKGROUND

Web crawlers include internet bots configured to systematically browse the Internet. A web crawler begins with an initial, or seed, list of URLs to visit. From there, the web crawler identifies webpages to which each URL links and stores the identified webpages in a repository. In order to identify relevant webpages, a web crawler visits the webpages. But some webpages change over time. To ensure that content is fresh, e.g., accurately reflects changes, the web crawler needs to recrawl, or revisit, a webpage periodically.

SUMMARY

Implementations provide a refresh strategy that is configured to deliver accurate information to a user while minimizing use of computer resources. For example, web page content, such as an offer page, presents a product to a user at a price within the browser. The dynamic nature of presenting offers on the Internet means that a repository of data obtained from the offer pages may need to be updated frequently. Such updates occur using a web crawler—more specifically, a recrawl operation by the web crawler on a repository of URLs. Each recrawl operation uses a certain amount of network resources and accordingly a recrawl strategy that works within a limited amount of network resources is desired. While individual recrawl strategies over a given number of offers have been used, the efficacy of these strategies is not always optimal. In contrast, disclosed techniques use a combination of multiple recrawl strategies to optimize factual freshness within network resource constraints. Disclosed implementations determine a policy for selecting a recrawl strategy at any given instant in time using a K-armed adversarial bandit algorithm, where each arm is a different recrawl strategy. The K-armed adversarial bandit determines a distribution of importance weights assigned to each recrawl strategy. Moreover, each recrawl strategy corresponds to a respective recrawl rate, which is determined from parameter values such as click rate, impression rate, and change rate. Conventional recrawl strategies assume particular, static values of these parameters, although such parameter values are not in reality static. In contrast, disclosed implementations include a process for estimating these parameter values using both history data and metadata, alone and in combination, in a deep learning algorithm. Using this K-armed adversarial bandits process along with a deep learning parameter value estimation, improved factual freshness results are attained with minimal computing resources.

In one general aspect, a method can include receiving, from a repository, entity data representing a plurality of entities, each of the plurality of entities having a respective value of a quantity, the values of the quantities being accurate at a previous time. The method can also include, for each of the plurality of entities, generating a respective value for each of a plurality of parameters at a current time, the parameters including at least one of an access rate of that entity from the repository and a likelihood of a change in the value of the quantity of that entity. The method can further include selecting a refresh strategy of a plurality of refresh strategies for updating the value of the quantity of each of the plurality of entities according to a refresh policy. The method can further include generating a respective refresh rate for each of the plurality of entities according to the selected refresh strategy, the refresh rate for an entity of the plurality of entities being based on the values of the plurality of parameters at a sequence of times prior to the current time. The method can further include performing a refresh operation on the repository based on the respective refresh rates for the plurality of entities, the refresh operation being configured to obtain the value of the quantity of an entity at the current time. The method can further include updating the refresh policy based on a difference between the value of the quantity at the previous time and the value of the quantity at the current time of each of the plurality of entities.

In another general aspect, a computer program product comprises a nontransitory storage medium, the computer program product including code that, when executed by processing circuitry of a computing device, causes the processing circuitry to perform a method. The method can include receiving, from a repository, entity data representing a plurality of entities, each of the plurality of entities having a respective value of a quantity, the values of the quantities being accurate at a previous time. The method can also include, for each of the plurality of entities, generating a respective value for each of a plurality of parameters at a current time, the parameters including at least one of an access rate of that entity from the repository and a likelihood of a change in the value of the quantity of that entity. The method can further include selecting a refresh strategy of a plurality of refresh strategies for updating the value of the quantity of each of the plurality of entities according to a refresh policy. The method can further include generating a respective refresh rate for each of the plurality of entities according to the selected refresh strategy, the refresh rate for an entity of the plurality of entities being based on the values of the plurality of parameters at a sequence of times prior to the current time. The method can further include performing a refresh operation on the repository based on the respective refresh rates for the plurality of entities, the refresh operation being configured to obtain the value of the quantity of an entity at the current time. The method can further include updating the refresh policy based on a difference between the value of the quantity at the previous time and the value of the quantity at the current time of each of the plurality of entities.

In another general aspect, an electronic apparatus configured to generate a refresh policy comprises memory and controlling circuitry coupled to the memory. The controlling circuitry can be configured to receive, from a repository, entity data representing a plurality of entities, each of the plurality of entities having a respective value of a quantity, the values of the quantities being accurate at a previous time. The controlling circuitry can also be configured to, for each of the plurality of entities, generate a respective value for each of a plurality of parameters at a current time, the parameters including at least one of an access rate of that entity from the repository and a likelihood of a change in the value of the quantity of that entity. The controlling circuitry can also be configured to select a refresh strategy of a plurality of refresh strategies for updating the value of the quantity of each of the plurality of entities according to a refresh policy. The controlling circuitry can also be configured to generate a respective refresh rate for each of the plurality of entities according to the selected refresh strategy, the refresh rate for an entity of the plurality of entities being based on the values of the plurality of parameters at a sequence of times prior to the current time. The controlling circuitry can also be configured to perform a refresh operation on the repository based on the respective refresh rates for the plurality of entities, the refresh operation being configured to obtain the value of the quantity of an entity at the current time. The controlling circuitry can also be configured to update the refresh policy based on a difference between the value of the quantity at the previous time and the value of the quantity at the current time of each of the plurality of entities.

The details of one or more implementations are set forth in the accompanying drawings and the description below. Other features will be apparent from the description and drawings, and from the claims.

DETAILED DESCRIPTION

Figure 1A:
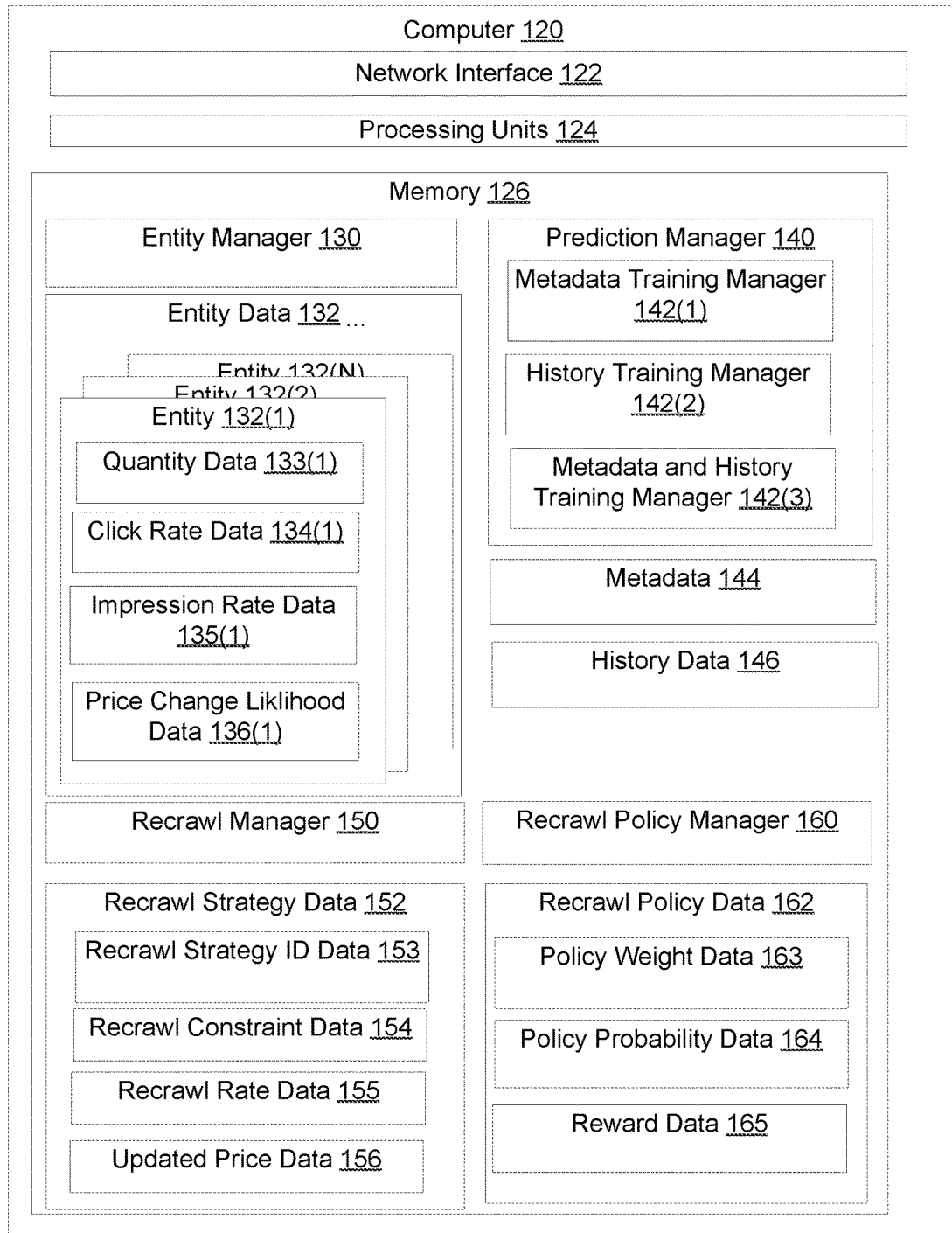
FIGS. 1A and 1B are diagrams that illustrate an example electronic environment in which improved techniques described herein may be implemented.

Web crawlers provide content of webpages to a search system, e.g., for indexing and retrieval. Because web crawlers can use significant network resources, web crawlers often employ one or more strategies to determine what webpages to visit. Some example scheduling strategies include breadth-first, backlink count, and PageRank computations.

Because some webpages are dynamic and constantly changing, some web crawlers perform recrawling of websites to ensure that the content of those websites in the search system is fresh. That is, content is fresh when the content of a webpage delivered to a user's web browser from the search system is identical to the content of that webpage stored on the server hosting the webpage. A conventional approach to generating policies for recrawling websites includes recrawling websites at a uniform rate, i.e., each page recrawled with equal probability.

A technical problem in generating policies for recrawling websites is that the above-described conventional approach performs poorly when the recrawling is performed for highly dynamic content. A domain may have highly dynamic content when the domain includes webpages that change (e.g., are added/deleted) frequently and/or has webpages where factual information on the page changes frequently. Examples of such highly dynamic content include commercial web content, news outlets, weather forecasts, movie reviews, etc. Commercial domains may include web content having quantity data, such as an offer to a user to purchase a product at a price. Such content may also be referred to as an offer page. But not all content of a domain changes at the same rate. For example, in some cases, the price of a first offer on a first webpage in the domain varies rapidly over time, while the price of a second offer on a second webpage in the domain varies slowly. Moreover, the rate of change of the first webpage may not be constant, e.g., with prices changing more rapidly close to a holiday or some other event and less rapidly after the holiday or event. The goal of a web crawler is to optimally synchronize the factual content (e.g., quantity information including price information) stored in the search system's repository with the content stored at the domain. The content stored in the search system is referred to as stale if that content does not match the content stored at the domain.

Refreshing dynamic factual content, such as offer pages, at a uniform rate does not optimally use network resources. To ensure content is fresh, the web crawler would crawl frequently, but frequent crawl requests consume unnecessary network resources if the content has not changed and can also overwhelm the domain. Crawling less often ensures the domain is not overwhelmed and conserves network resources but results in more stale content. Thus, recrawl scheduling is often a balance between network resources (frequency of crawling) and staleness. One conventional recrawl scheduling strategy includes a page selection heuristic which chooses webpages based on change rates. Another conventional strategy, known as LambdaCrawl, seeks optimal recrawl rates under resource constraints.

Some web crawlers focus on a single strategy. Such single strategy crawlers, however, usually crawl one particular type of webpage, and accordingly may fail to effectively crawl other page types.

In accordance with the implementations described herein, a technical solution to the above-described technical problem includes generating an adaptive multiple strategy approach using a number of different recrawl strategies. In some implementations, each strategy is an arm of a K-armed adversarial bandit algorithm with reinforcement learning. In some implementations, the multiple strategy approach may use machine learning to estimate parameters such as a click rate, impression rate, and likelihood of price change, i.e., change rate. These parameters are assumed to be known in the conventional approaches. The problem with such conventional approaches is that the knowledge of the change rate beforehand, for example, is usually unavailable in practice. To obtain such information, conventional methods developed various estimation approaches. A simple one involves estimating the change rate from the past history. However, such an approach suffers from the cold start issue and is subject to the feedback loop. These drawbacks motivated other approaches to incorporate predictive features that are universally available or relatively static, e.g. page content, when predicting change rate. In contrast, disclosed implementations may include estimating the change rate, click rate, and impression rate using not only history data but also metadata, both separately and in combination.

A technical advantage of disclosed implementations is that such a multiple strategy approach achieves higher freshness than any single strategy and is robust under tight resource constraints (e.g., computer processing cycles, network bandwidth, etc.). Also, the parameter estimation substantially affects the effectiveness of a recrawl strategy. Accordingly, disclosed implementations use a predictive model that takes both the past history and metadata information into account. The disclosed predictive model improves upon a history-based model. The K-armed adversarial bandits approach, used by disclosed implementations, combines multiple recrawl strategies under a unified policy with provable freshness guarantees. Disclosed implementations outperform single strategies, including a resource-optimized strategy such as LambdaCrawl (which is contingent on the constancy of content change rate), even when such a resource-optimized strategy is not included as a candidate strategy.

Generally, the above-described technical solution can be configured to update a refresh policy, of which a recrawl policy is a special case. Accordingly, the technical solution is not limited to recrawling operations. Nevertheless, unless explicitly stated, the implementations herein are directed to updating recrawl policies.

Figure 1B:
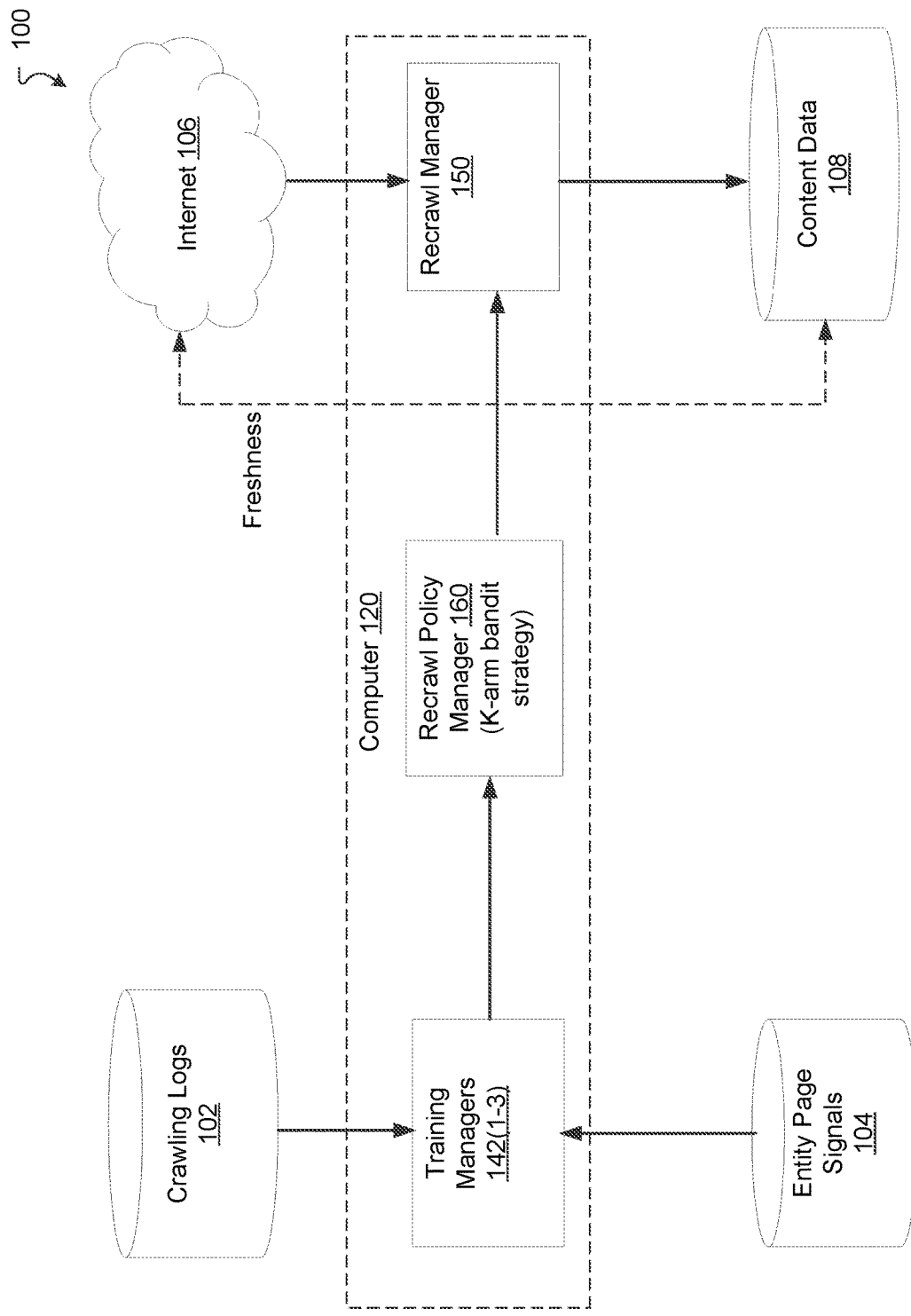

FIGS. 1A and 1B are diagrams that illustrate an example electronic environment 100 in which the above-described technical solution may be implemented. The computer 120 is configured to generate and execute policies for recrawling websites. Put another way, the computer 120 may be referred to as a production crawler.

The computer 120 includes a network interface 122, one or more processing units 124, and memory 126. The network interface 122 includes, for example, Ethernet adaptors, Token Ring adaptors, and the like, for converting electronic and/or optical signals received from the network 150 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include an entity manager 130, a prediction manager 140, a recrawl manager 150, and recrawl policy manager 160. Further, as illustrated in FIG. 1A, the memory 126 is configured to store various data, which is described with respect to the respective managers that use such data. Note that, in some implementations, an entity page corresponds to an offer page that includes an offer to sell a product.

FIG. 1B illustrates an example electronic environment 100 in which the improved techniques may be performed. Electronic environment 100 includes a repository of crawling logs 102, a repository of entity page signals 104, an Internet 106 (or, alternatively, the World Wide Web), a repository of content 108, and the computer 120 of FIG. 1A.

The repository of crawling logs 102 is configured to store crawl history data. The crawl history data is used, in some implementations, by the prediction manager 140 and, more specifically, training managers 142 configured to train models, to estimate parameters for crawl rate computations.

The repository of entity page signals 104 is configured to store metadata related to content included in the entity pages. Example metadata stored in entity page signals 104 include brand identifier, merchant identifier, country code, and the like. Further details about metadata are described with regard to Table 3. In some implementations, the metadata is also used by the prediction manager 140 to train the models used to estimate parameters for crawl rate computations.

The repository of content data 108 is configured to store content extracted from the entity web pages as well as the URLs pointing to the entity web pages. The content data 108 can include factual data for an entity. Factual data can include, for example, a price or availability of a product offered for sale, or product ratings The factual data may also be referred to as a quantity. It is understood that each quantity (e.g., fact) has a value. Thus, for example, a price is understood to have a value representing the price and availability has a value representing the availability. Accordingly, as used herein, quantity can refer to the label (e.g., price, availability) or the value for the label, as appropriate. The freshness of the factual data is indicated by agreement between the values of the quantities (e.g., prices of offers) stored in the repository of content data 108 and the values of the quantities found on the domain (not shown), e.g., obtained via the Internet 106. A value stored in the content data 108 for an entity is considered fresh if it matches the value of the same quantity for the entity on the domain. Otherwise a value stored in the content data 108 for an entity is stale.

Implementations are not limited to the exact configuration illustrated in FIG. 1B. For example, any of crawling logs 102, entity page signals 104, and/or content data 108 may be included as part of computer 120, e.g., stored in memory 126. As another example, any of crawling logs 102, entity page signals 104, and/or content data 108 may be remote from but accessible to computer 120. In some implementations, one or more of crawling logs 102, entity page signals 104, content data 108 and computer 120 may be part of a distributed computing system.

Returning to FIG. 1A, the entity manager 130 is configured to receive entity data 132 representing entities 132(1), 132(2), . . . , 132(N). In some implementations, the entity manager 130 receives the entity data 132 over the network interface 122, i.e., over a network (such as Internet 106) from a remote computer (not pictured). In some implementations, the entity manager 130 receives the entity data 132 from local storage (e.g., a disk drive, flash drive, SSD, or the like).

The entities (e.g., offers) 132(1), 132(2), . . . , 132(N) represented by the entity data 132 are, in some implementations, each offers to purchase a product, for example. Such offers may be found within a search tool in a browser, e.g., Google Shopping. Such entities may also be referred to as product offers or just offers. Other examples of entities include [event pages (e.g., a time or location of an event that is subject to change) or user-generated reviews of an event. Each of the entities 132(1), 132(2), . . . , 132(N) (e.g., entities 132(1)) includes respective quantity data 133(1) representing a quantity at a previous time. Each quantity at a previous time (e.g., price) may need to be updated with the latest information from the Internet 106 via URLs from the content data 108. Entity data 132 also includes, for each entity (e.g., entity 132(1)) values of parameters: click rate $\mu$ represented by click rate data 134(1), impression rate $\nu$ represented by impression rate data 135(1), and a likelihood A of a price change, represented by quantity (e.g., price) change likelihood data 136(1). Click rate μ represents the number of times a user selects the entity from a search result per time interval. The impression rate v indicates the number of times an entity is displayed in a search result per time interval.

For ease in discussing FIG. 1A, the remaining discussion of FIG. 1A will use an example where the entity data 132 represents offer data, i.e., an offer to sell a product, and the quantity data represents a price of an offer. The entities 132(1), . . . , 132(N) are therefore referred to as offers and the quantity data 133 as price data. However, implementations are not limited to offers and price data.

The prediction manager 140 is configured to generate predictions of the values of the click rate, impression rate, and change rate based on metadata 144 and history data 146. Specifically, the price change prediction is modeled as a classification task, for which a goal is to predict whether an offer's price will change in the next day. Similarly, for click rate and impression rate prediction, a forecast includes determining whether an offer will be clicked or impressed in the next day. The prediction outputs will be directly used as μ, v and Δ when computing the crawling rate. In some implementations, the prediction horizon is set at the daily granularity since click and impression statistics are aggregated on the daily basis. However, implementations can use other prediction horizons, e.g., hourly, weekly, every-other-day, etc.

The recrawl manager 150 is configured to perform a recrawl operation to recrawl a repository of URLs for webpages. The webpages may have quantity (e.g., pricing) information for the offers 132(1), 132(2), . . . , 132(N). The recrawl operation is performed by the recrawl manager 150 according to one of a plurality of recrawl strategies. Each recall strategy is represented by recrawl strategy data 152.

The recrawl strategy data 152 includes data items that define the plurality of recrawl strategies. For example, the recrawl strategy data 152 can include recrawl strategy identifier data 153, which represents identifiers corresponding to each of the recrawl strategies. For example, recrawl strategies considered herein include a uniform strategy, a change-weighted strategy, a click-weighted strategy, an impression-weighted strategy, and a resource-optimized strategy. These strategies are not exhaustive and other recrawling strategies may be used. The recrawl strategy data 152 can include recrawl constraint data 154. The recrawl constraint data 154 represents a constraint on network resources that limits the amount of recrawls per time step that may be carried out. In some implementations, this constraint may be expressed in terms of an aggregated recrawl rate, i.e., a total number of recrawl events per time step, across all recrawl strategies. The recrawl strategy data 152 can include recrawl rate data 155, which represents a number of recrawl events performed per time step. The time step is dependent on the crawler. In some examples the time step may be an hour. In addition, the recrawl strategy data 152 may include updated quantity (e.g., price) data 156 for each offer 132(1), . . . , 132(N) obtained as a result of a recrawl according to a recrawl strategy.

The recrawl policy manager 160 is configured to generate a recrawl policy, represented by recrawl policy data 162. A recrawl policy is a distribution of weights over the multiple recrawl strategies, each weight indicating a level of importance of a strategy and, accordingly, how often that strategy is used in recrawl operations. In some implementations, the recrawl policy manager 160 generates recrawl policy data 162 using reinforcement learning. Reinforcement learning is a type of machine learning that determines actions to be taken to maximize a reward. Implementations may use a reward for a recrawl that results in an updated quantity for an entity, e.g., a recrawl that extracts a change in price for a product offered for sale. No reward may be given for a recrawl that does not result in an updated quantity, e.g., a recrawl that extracts the same quantity that is already stored in the repository for the product.

The recrawl policy data 162 represents the recrawl policy and may include policy weight data 163. The policy weight data 163 ultimately includes a distribution of weights over the recrawl strategies. Each recrawl strategy has its own weight distribution in the policy weight data 163. A weight for a strategy k may be denoted as $w_k$. Each weight corresponds to a likelihood that, at the next instant of time, a particular recrawl strategy will be selected. Thus, the weight may be distributed over a time series. The importance weight of a strategy k at time step t in the time series may be denoted as $w_k^t$.

The recrawl policy data 162 may include policy probability data 164. Policy probability data 164 is an intermediate quantity used in a K-armed adversarial bandits algorithm from which adjustments to the policy weight data are derived at each time step. For example, the policy probability data 164 includes an exploration probability and represents a probability that a recrawl strategy will be selected according to the current weight and the exploration probability. The exploration probability itself indicates a likelihood that the "arm" of the adversarial bandits, or recrawl strategy chosen, is not chosen solely according to the historical policy represented by the policy weight data 163, but rather a uniformly-weighted policy. In other words, the exploration probability prevents the system from selecting a next recrawl strategy based solely on historical data, which makes the system robust and avoids historical bias.

The recrawl policy data 162 may include reward data 165. The reward data 165 is also an intermediate quantity used in the K-armed adversarial bandits algorithm from which adjustments to the policy weight data are derived at each time step. The reward data 165 represents a reward for selecting a particular arm, or recrawl strategy, over all offers at an instant of time. The reward per offer, or per-offer utility, indicates whether the reward strategy for that offer produced an update for the price of that offer. Put another way, the reward data 165 represents a reward for a recrawl that identifies a change in the quantity.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to generate and/or update a recrawl policy. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed by a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an entity manager 130 (and/or a portion thereof), a prediction manager 140 (and/or a portion thereof), a recrawl manager 150 (and/or a portion thereof), and a recrawl policy manager 160 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1A, the memory 126 is configured to store various data, including entity data 132, metadata 144, history data 146, recrawl strategy data 152, and recrawl policy data 162.

It will be assumed herein that the entity data 132 represents offer data which represents an offer to sell a product. Along these lines, the value of the quantity is a price of an offer. The entities 132(1), . . . , 132(N) are assumed to be offers.

Before delving into the details for generating a recrawl policy, a formal description of the problem is presented. Suppose there are a total number of n offers $(o_1, o_2, \ldots, o_n)$ in the search environment, e.g., crawling logs 102. Each offer $o_i$ (also referred to as an entity) is represented as a time series, with the data point at time step t denoted by a vector of three parameters $(\mu_i^t, v_i^t, \Delta_i^t)$. In this example, $\mu_i^t \in R^+$ represents the click rate, $v_i^t \in R^+$ represents the impression rate and $\Delta_i^t \in [0, 1]$ represents the probability of price change (change in quantity). Because of the price change, the crawler needs to periodically recrawl offers so that a local repository (e.g., content data 108) can store the latest information. A recrawl rate $\rho_i^t \in R^+$ is then defined to represent the amount of recrawls made for offer $o_i$ at time step t.

Furthermore, the latest price of offer $o_i$ at time step t as is denoted as $r_i^t$, which might or might not be observed by a recrawl strategy. In other words, $r_i^t$ represents the actual price for the offer $o_i$ at time step t at the domain (source of the offer). In the meantime, each recrawl strategy also maintains a price $l_i^t$ in the content data 108 for serving end users. At access time, users will see the right price only if $r_i^T$ matches $l_i^t$, i.e. $1(r_i^t = l_i^t f)$, where $1(\bullet)$ is a binary indicator. The price match is a function of two factors—the price change history and the recrawl history.

Production crawlers, e.g., such as computer 120, also need to deal with resource constraints. In this example, a fixed crawling constraint of b offers is assumed at each time step. A goal is to find recrawling rates $\mathcal{P}^t = (\rho_1^t, \rho_2^t, \ldots, \rho_n^t)$ that can maximize the overall utility given the resource restrictions. Thus, if recrawling an offer updates the local price (e.g., in content data 108) to the latest price in the domain, a crawl is useful. Thus, for web crawling, freshness is often adopted to represent the utility. Disclosed implementations may employ two freshness metrics to determine utility: click-weighted freshness and page-level freshness. An offer is said to be fresh if its local price $l_i^t$ matches its true price $r_i^t$. Here, since each page corresponds to one product offer, page-level freshness may be referred to as the offer-level freshness. The click-weighted freshness measures the percentage of clicks when users see the right price, whereas the offer-level freshness examines, at a certain time step, the proportion of offers with price information updated regardless of clicks.

Table 1 summarizes the notation used to represent the data elements used in the disclosed environment.

TABLE 1

| Notations used herein | | | |
|---|---|---|---|
| $o_i$ | A product offer i | t | A time step or instant of time |
| n | A total number of offers | b | Offer crawling constraint at instant of time t |
| $\mu_i^t$ | Click rate of $o_i$ at instant of time t | $v_i^t$ | Impression rate of $o_i$ at instant of time t |
| $l_i^t$ | Local price of $o_i$ at instant of time t | $r_i^t$ | True price of $o_i$ at instant of time t |
| $\rho_i^t$ | Recrawl rate of $o_i$ at instant of time t | $\Delta_i^t$ | Change rate of $o_i$ at instant of time t |

TABLE 1-continued

Notations used herein

| | |
|---|---|
| $x_{i,k}^t$ | The reward of applying a recrawl strategy k for $o_i$ at instant of time t |
| $x_k^t$ | The aggregated reward accumulated over all offers $o_i$, i = 1, 2, . . . , n |
| $A_t$ | The recrawling strategy (i.e., arm of the K-adversarial bandits) applied at instant of time t |

The recrawling task, e.g., of the recrawl manager 150, is modeled as a K-armed adversarial bandits (KAB) problem, where each recrawl strategy is treated as an arm. At each time step, one arm is selected based on its historical performance, entities (offers) to crawl using the selected arm are determined, rewards are observed and the selected arm's performance is updated. By repeating this process, the arm selection process can improve as time goes on.

Table 2 summarizes the recrawl strategies discussed herein. It is understood that the recrawl strategies listed here or even the number of recrawl strategies are not required, and other recrawl strategies, or more or less than five recrawl strategies listed are possible using the improved techniques.

TABLE 2

| Recrawl Strategy | Recrawl Rate $\rho_i^t$ |
|---|---|
| Uniform | $b \cdot 1/n$ |
| Change-weighted ($\Delta$) | $b \cdot \Delta_i^t / \Sigma_i \Delta_i^t$ |
| Click-weighted ($\mu$) | $b \cdot \mu_i^t / \Sigma_i \mu_i^t$ |
| Impression-weighted ($\nu$) | $b \cdot \nu_i^t / \Sigma_i \nu_i^t$ |
| Resource-optimized ($\lambda$) | $\frac{\sqrt{\frac{\mu_i^t \Delta_i^t}{\lambda}} - \Delta_i^t}{1 - \Delta_i^t}; \lambda = \left( \frac{\Sigma_i \sqrt{\frac{\mu_i^t \Delta_i^t}{1 - \Delta_i^t}}}{b + \Sigma_i \frac{\Delta_i^t}{1 - \Delta_i^t}} \right)^2$ |

Recrawl strategies and their respective recrawl rates.
Note
that $b = \Sigma_i \rho_i^t$.

Figure 2:
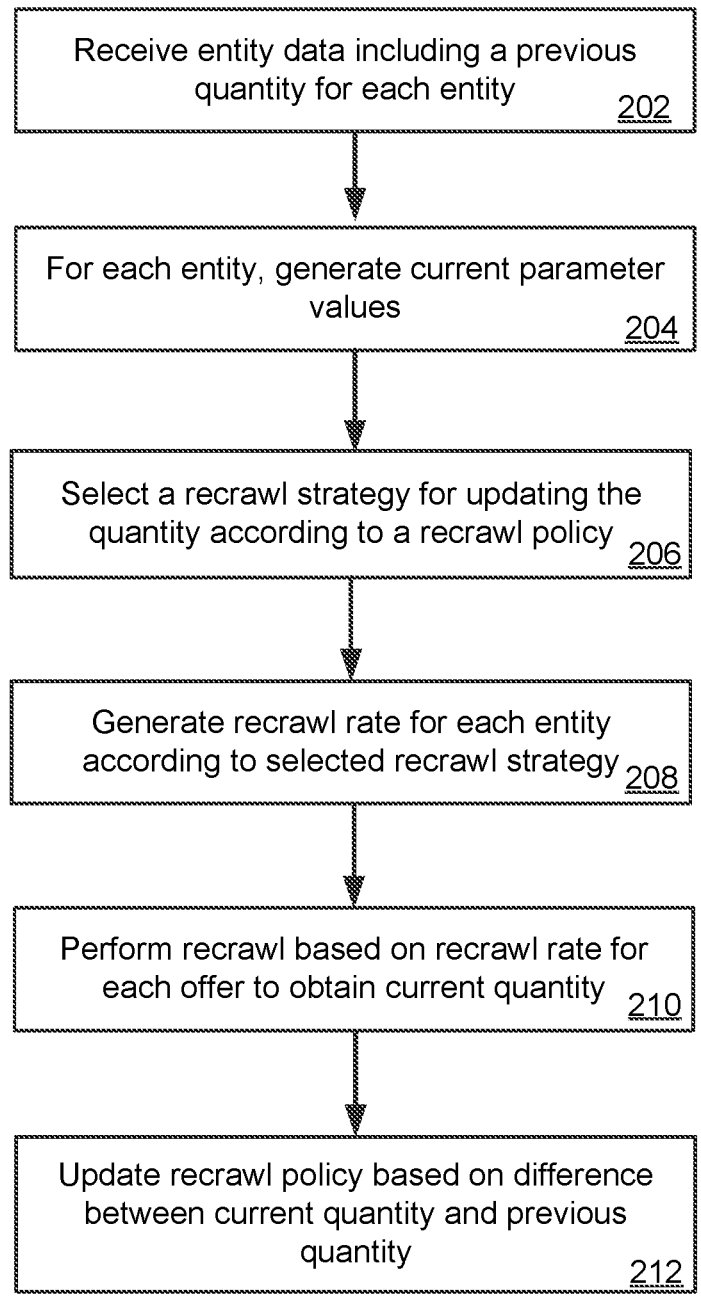
FIG. 2 is a flow chart that illustrates an example method of determining a web recrawl policy, according to disclosed implementations.

FIG. 2 is a flow chart depicting an example method 200 of generating and using a recrawl policy for recrawling websites, according to an implementation. The method 200 may be performed by software constructs described in connection with FIG. 1, which reside in memory 126 of the computer 120 and are run by the set of processing units 124. Method 200 generates and uses a recrawl policy by estimating parameters for recrawl rates of various recrawl strategies, and then employs a reinforcement learning via, e.g., a K-armed adversarial bandits algorithm to derive a distribution of weights over the recrawl strategies that define the recrawl policy.

At 202, the entity manager 130 receives, from a repository, entity data 132 representing a plurality of entities (e.g., offer 132(1), . . . , 132(N)), each of the plurality of entities having a respective value of a quantity (e.g., a price at which to sell a product), the values of the quantity being accurate at a previous time. For example, prices at the previous time may have been obtained from the content repository 108 during a previous crawl.

At 204, the prediction manager 140, for each of the plurality of entities, generates values of a plurality of parameters at a current time. The parameters include at least one of a click rate, an impression rate, or a likelihood of a change in the value of the quantity of that entity (e.g., price of that offer). In conventional approaches, these parameter values were taken from historical data. In contrast, disclosed implementations generate these parameter values using a neural network. The neural network is based on not only historical data, but also metadata, e.g., stored in entity signal repository 104. As discussed below with regard to FIG. 4, a model based on metadata and history outperforms a model based only on history or price change prediction At 206, the recrawl manager 150 selects a recrawling strategy of a plurality of recrawling strategies (represented by recrawl strategy data 152). The selected recrawling strategy is used to update the local repository, e.g., content data 108 by recrawling the entity pages. As will be described with regard to FIG. 3, the selection may be made in accordance with a probability distribution over the plurality of recrawl strategies.

At 208, the recrawl manager 150 generates a respective recrawl rate (represented by recrawl rate data 155) for each of the plurality of entities according to the selected recrawl strategy. The recrawl rate for an entity of the plurality of entities is based on the values of the plurality of parameters (click rate, an impression rate, or a likelihood of a change) at the sequence of times. For example, if the selected recrawl strategy is a uniform recrawl strategy, the recrawl rate is equal over all entities. As another example, if the selected recrawl strategy is change weighted, the selected recrawl rate is proportional to a change rate for an entity. In this case, the change rate is determined through the prediction discussed with regard to FIG. 4. The recrawl rate for other recrawl strategies may be similarly generated, as outlined in Table 2.

At 210, the recrawl manager 150 schedules recrawl operations on the repository 108 based on the recrawl rate for each of the plurality of entities. In other words, for the current time step (e.g., an hour, a week, twice a day, etc.) the recrawl manager 150 schedules a particular entity for recrawl p times during the time step. Each recrawl of an offer obtains the value of the quantity of each of the plurality of entities. This updated value is as-of the current time.

At 212, the recrawl policy manager 160 updates the recrawl policy (represented by recrawl policy data 162) based on the recrawls. Each time an offer page is recrawled, the recrawl policy manager 160 updates a time series of the value of the quantity for that entity. This updated quantity value becomes part of the history data that is used to predict parameter values at a next crawl, e.g., as part of step 204. Updating the recrawl policy also includes calculating a reward. The reward is boosted by the click rate. In some implementations, reward may be normalized to [0,1] and may be expressed as $$x_k^t = \sum_i x_{i,k}^t = \sum_i \frac{\mu_i^t \rho_i^t}{\sum_i \mu_i^t \rho_i^t} \cdot u_i^t \cdot p_i^t \cdot 1(l_i^{t-1} \neq r_i^t).$$

In addition, the updated quantity may be used to further train the prediction model (e.g., a neural network) for computing parameter values at later times.

Figure 3:
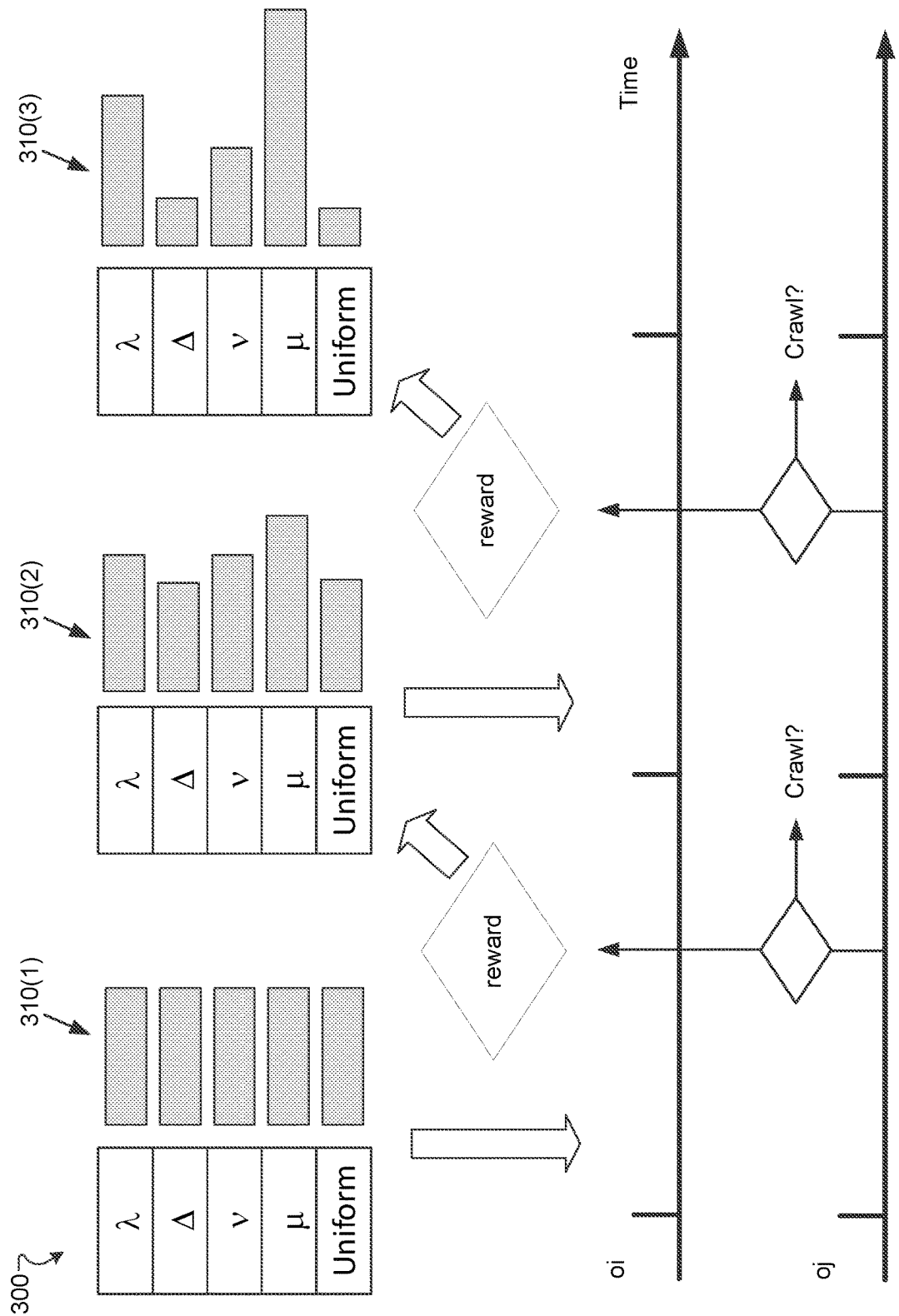
FIG. 3 is a diagram of an example method of generation of a web recrawl policy, according to disclosed implementations.

FIG. 3 is a diagram example method 300 of generation of a web recrawl policy. In FIG. 3, the method starts with choosing every arm having an equal chance of selection at time step 1 (310(1)). A crawl strategy is selected and recrawls scheduled according to the strategy. After recrawling, the system calculates the rewards (for each entity) and updates the historical performance of the crawling strategy. Over time, through aggregating rewards, certain recrawl strategies gain more preference. In the example of FIG. 3, the click-weighted strategy and resource-optimized strategy are illustrated as getting progressively more preference as time passes (see 310(1) at t=1, 310(2) at t=100, and 310(3) at t=100). Note that implementations may use fewer recrawl strategies than those illustrated in FIG. 3. Implementations may also use more and/or different recrawl strategies.

Compared to adopting a single strategy, using adversarial bandits is more advantageous in the following aspects: (1) incorporating multiple strategies allows us to explore offers from different angles, making it more robust to the errors made by an individual strategy; (2) different from stochastic bandit algorithms, adversarial bandits do not make stationarity assumptions on reward distribution, which is a better choice where the reward (click-weighted freshness) is dynamic.

The adversarial bandits approach—more specifically, an adjusted version of an EXP3 algorithm, may be formalized as follows: assume that there are K candidate arms, and let $x_k^t \in [0, 1]$ indicate the reward one will receive by adopting the k-th arm at time step t. The goal is to choose a sequence of arms $(A_1, A_2, \ldots, A_t, \ldots)$ so that by applying those arms, a regret (R) of not using the best arm at every time step is minimized. Note that instead of sampling an arm per offer per time step, only one arm is selected (e.g., step 206) at each time step and is applied across all offers. This avoids a joint optimization of resource constraints over multiple strategies since the crawling rates for each time step have already incorporated the resource constraint.

The regret R is given by the following expression:

$$R = \left(\max_{k \in [K]} \sum_t x_k^t\right) - \mathbb{E}\left[\sum_t x_{A_t}^t\right] \quad (1)$$

The reward $x_k^t$ (or $x_{A_t}^t$) is calculated by accumulating per offer utility $x_{i,k}^t$—the payoff by applying the k-th arm for offer $o_i$ at time step t (e.g., as part of steps 210 and 212). Regret is defined as follows: if crawling an offer helps updating the local price to the latest, such a crawl is considered useful, and accordingly a positive reward is assigned. The local price from time step (t−1) is used to verify that it will not match the true price at time step t; if these prices do match, there will be no utility gain for crawling this offer. To align with the click-weighted freshness, the reward is boosted by the click rate. In fact, this utility measures the increase of click-weighted freshness between two time steps. The recrawling rate $\rho_i^t$ is used to denote whether the offer will be crawled because there will be no utility gain if not crawling the offer. In addition, a normalization term is included to rescale the reward to [0, 1].

The reward is updated as shown in Eq. (2):

$$x_k^t = \sum_i x_{i,k}^t = \sum_i \frac{\mu_i^t \rho_i^t}{\sum_i \mu_i^t \rho_i^t} 1(l_i^{t-1} \neq r_i^t) \quad (2)$$

Minimizing regret R is equivalent to maximizing the expected reward, the second term in Eq. (1), since the accumulated reward for applying the best strategy at every time step is a constant factor. Furthermore, based on the definition in Eq. (2), the time aggregated reward actually represents the click-weighted freshness, meaning that disclosed implementations using the adversarial bandits approach are essentially optimizing the click-weighted freshness.

Example implementation details are described in Algorithm 1. Algorithm 1 is one example of an implementation of method 200 of FIG. 2.

---

Algorithm 1 The K-armed adversarial bandits approach

Parameter: $\gamma \in [0, 1]$
1: $\forall k$, set $w_k^0 = 1$
2: for time t = 1, 2, ..., T do 3: $\forall k$, set $q_k^t = (1 - \gamma)\frac{w_k^t}{\sum_{j=1}^K w_j^t} + \gamma \frac{1}{K}$ 4: Sample an arm $A_t \sim Q_t$: $(q_1^t, q_2^t, \ldots, q_K^t)$
5: Set the reward $x_{A_t}^t = 0$
6: for offer i = 1, 2, ..., n do
7: Compute $o_i$'s crawling rate $\rho_i^t$ for arm $A_t$ according to Table 2
8: Schedule $\rho_i^t$ crawls (from the crawling log repository 108) and update local price $l_i^t$
9: Update reward $x_{A_t}^t += x_{i,A_t}^t$
10: end for 11: $\forall k \; w_k^{t+1} = w_k^t \exp\left(\frac{\gamma}{K} 1(k = A_t) \frac{x_{A_t}^t}{q_i^t}\right)$ 12: end for

---

Algorithm 1 starts by initializing a uniform importance weight $w_k^0=1$ for each arm (line 1). Here, k indicates the k-th arm and 0 stands for the time step t=0. At each time step t, a probability distribution $Q_t$ is computed with each element $q_k^t$ denoting the probability of choosing the k-th arm (line 3). $q_k^t$ is determined by the importance weight $w_k^t$ and the exploration probability $\gamma$. Next, an arm $A_t$ is sampled from $Q_t$ (line 4) and the corresponding offer crawling rate $\rho_i^t$ according to Table 2 (line 7) is computed. Note that the resource constraint b has already been integrated into $\rho_i^t$. While crawling, the reward $x_{A_t}^t$ is also aggregated for the sampled arm (line 9). At last, $w_k^t$ for the arm $A_t$ is calculated based on the reward (line 11). This updates the crawl policy. The method repeats for a next time step.

Algorithm 1 solves the exploitation-exploration trade-off in reinforcement learning by introducing the exploration probability $\gamma$. Algorithm 1 samples arms proportionally to their past performances at a probability of $1-\gamma$, and also maintains a probability of $\gamma$ to choose a random arm for exploration. In some implementations, $\gamma=0.1$.

In some implementations, the time step is assumed to be two hours. The crawling rate of Table 2 is calculated using a two-hour time step. In some implementations, the time step is every other hour. When the crawling rate in Table 2 is computed for each bi-hourly time step, the crawling rate should be multiplied by (12 hours/time unit).

Deploying the recrawl strategies used as arms in the K-armed adversarial bandit (except the uniform crawl) requires knowing the click rate, the impression rate, and the change rate. Disclosed implementations use a predictive modeling approach where both metadata and past history information are employed in the model for better parameter estimation accuracy.

Specifically, implementations may initially train prediction models based on existing crawl log data. In some implementations, the price change prediction is modeled as a classification task, for which a goal is to predict whether an offer's price will change in the next day or any time horizon depending on the data granularity. Similarly, for click and impression prediction, it is forecast whether an offer will be clicked or impressed in the next day. The prediction outputs are directly used as µ, v and Δ when computing the crawling rate. In some implementations, the prediction horizon may be set at the daily granularity since click and impression statistics are aggregated on the daily basis.

Implementations may adopt two change history features, including the monthly price change frequency and the most recent change. A set of click and impression history features, which are strong signals for predicting future clicks and impressions, may also be included. All of these features and their descriptions are provided in Table 3. The product category information may come from a shopping taxonomy, such as the Google Shopping product taxonomy. The change frequencies, click and impression statistics may be treated as numerically dense features, and the metadata information may be modeled by sparse features and is embedded into a low-dimensional space.

TABLE 3

History and metadata features that may be used in a predictive model

| History features for the predictive model | |
|---|---|
| Change frequency (1 month) | Price change frequency in last month |
| Most recent change | Time since most recent change |
| Clicks (1 day) | Clicks yesterday |
| Clicks (1 week) | Clicks in the past week |
| Clicks (2 weeks) | Clicks in the past 2 weeks |
| Clicks (1 month) | Clicks in the past month |
| Impressions (1 day) | Impressions yesterday |
| Impressions (1 week) | Impressions in the past week |
| Impressions (2 weeks) | Impressions in the past 2 weeks |
| Impressions (1 month) | Impressions in the past month |
| Metadata features for the predictive model | |
| Brand | Unique ID for a brand |
| Condition | Condition: new, used, or refurbished |
| Country | Country code |
| Day of Week | Day of week for prediction time |
| Language | Offer page language |
| Merchant | Unique ID for a merchant |
| Product Category | Product category |

For each prediction task, a model is trained with metadata and history features combined. An example model, which may be a feed-forward deep neural network (DNN) model, is adopted with TensorFlow DNNClassifier, where three hidden layers are set to 256, 128 and 64 hidden units in each layer. ReLU (Rectified Linear Unit) is used as the activation function for hidden units and the Adagrad algorithm to optimize the cross-entropy loss is chosen. Other neural network configurations may also be used. In some implementations, to deal with overfitting, both L1 and L2 regularization may be adopted and both set to 0.001. Implementations may use multiple sets of hyper-parameters. Such implementations have similar results.

An example crawl log may include millions of entities. For example, an example crawl log (e.g., 102) may include 1.3 million indexed offers with hourly crawls scheduled for these offers. Samples for training predictive models used by disclosed implementations may come from two types: (a) random uniform samples from the entire corpus of offers; and (b) click-weighted samples, to better represent popular offers with clicks. In total, billions of offer page snapshots may be crawled. For ease of discussion, an example time period covered by the logs may be from 2018/08/01 to 2019/04/10.

Figure 4:
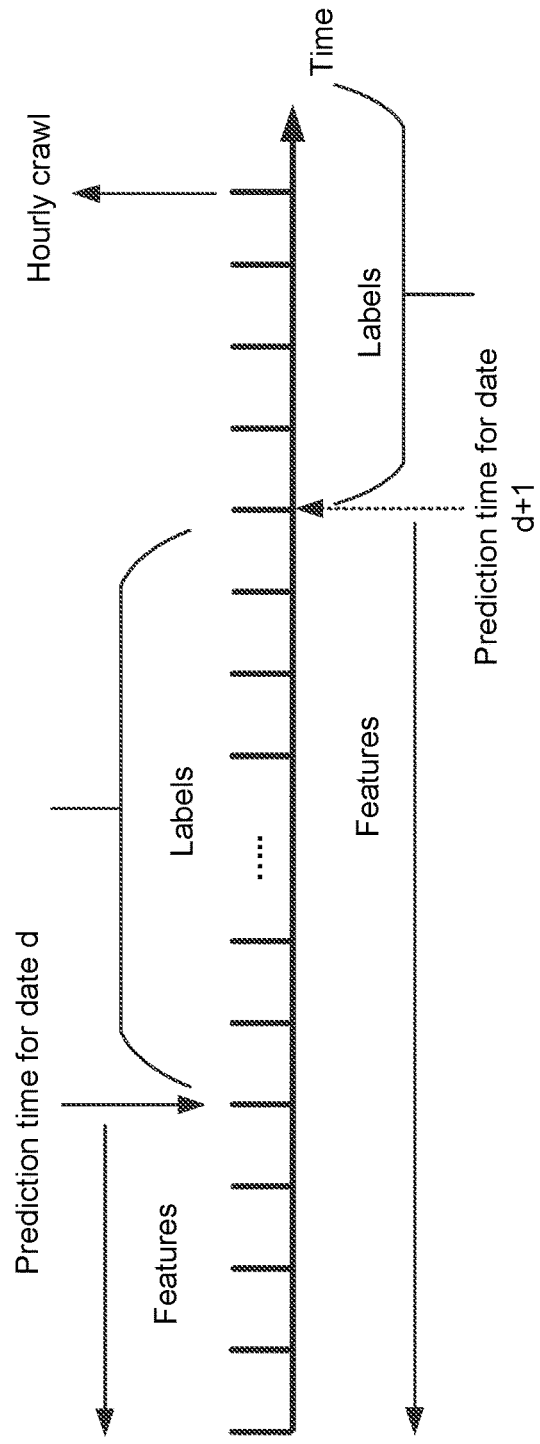
FIG. 4 is a diagram of an example dataset generation process for daily predictions, in accordance with disclosed implementations.

FIG. 4 is a diagram of an example dataset generation process 400 for daily predictions used in training predictive models used in disclosed implementations. As shown in FIG. 4, for each simulated prediction date d, the prediction time t is defined as the beginning of d (12:00 am). Features are then extracted from the crawling logs up to time t. Hourly crawls after t provide a full observation for the future price information, which helps generate a binary label reflecting whether the price will change in the next day. Similarly, the click and impression information on date d+1 are used to create a binary click/impression label denoting whether the offer will be clicked/impressed in the next day. By shifting the prediction date d and repeating the above process, a set of training, testing and validation examples are created.

The training, validation and testing datasets in this example are created with data from different dates. Particularly, in the example of FIG. 4, data from 2018/08/01 to 2018/12/31 is used for training, data from 2019/01/01 to 2019/01/09 is used for validation and the rest is used for testing. In total, 0.6 million validation examples, 8 million testing examples and 100 million training examples are obtained. In the testing and validation data, the positive/negative label ratios are 1:20 for price change, 1:75 for click and 1:6 for impression, whereas for the training data, we observe higher positive/negative ratios due to the involvement of click-weighted samples. The ratios become 1:20 for price change, 1:1 for click and 4:1 for impression. Note that since the uniform samples are picked randomly from the entire corpus, many are obsolete, removed or have no price extracted. This causes the number of testing and validation examples being lower than expected.

Implementations may be used with a predictive model based on metadata only, a predictive model based on history only, or a predictive model based on metadata and history. Table 4 illustrates that a model based on metadata and history is more accurate (as measured by Area Under Receiver Operating Characteristic Curve where value of 0.5 means a random guess while 1.0 indicates a perfect prediction).

TABLE 4

Testing AUCs (and standard deviations) for predictive models

| | Model | | |
|---|---|---|---|
| Task | Metadata | History | Metadata + History |
| Price change | 0.860 (0.008) | 0.833 (0.011) | 0.882 (0.007) |
| Click | 0.796 (0.021) | 0.948 (0.006) | 0.949 (0.006) |
| Impression | 0.736 (0.008) | 0.896 (0.003) | 0.895 (0.003) |

Figure 5:
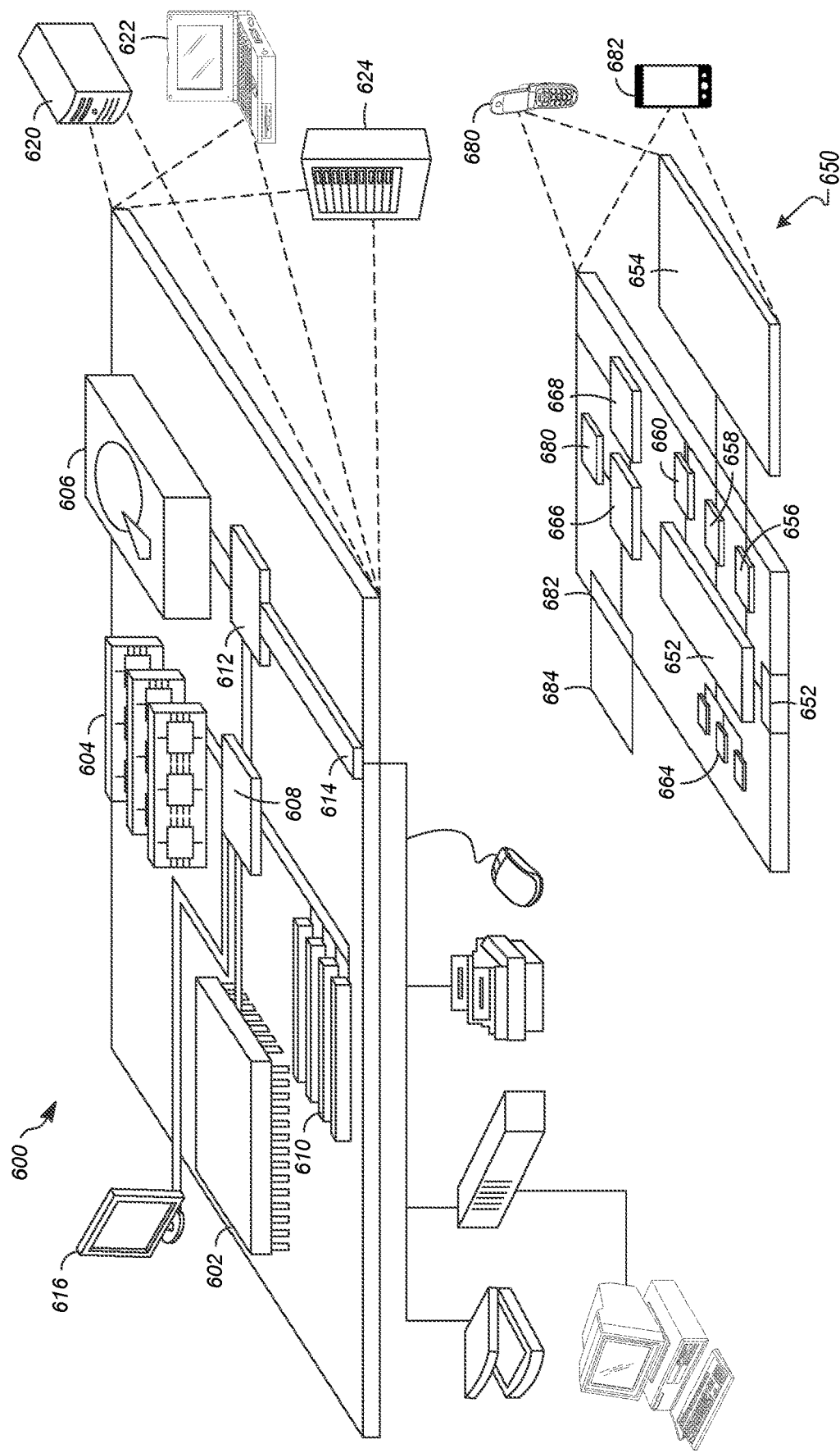
FIG. 5 illustrates an example of a computer device and a mobile computer device that can be used to implement the described techniques.

FIG. 5 illustrates an example of a generic computer device 600 and a generic mobile computer device 650, which may be used with the techniques described here. Computer device 600 is one example configuration of computer 120 of FIG. 1 and FIG. 2.

As shown in FIG. 5, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Figure 6:
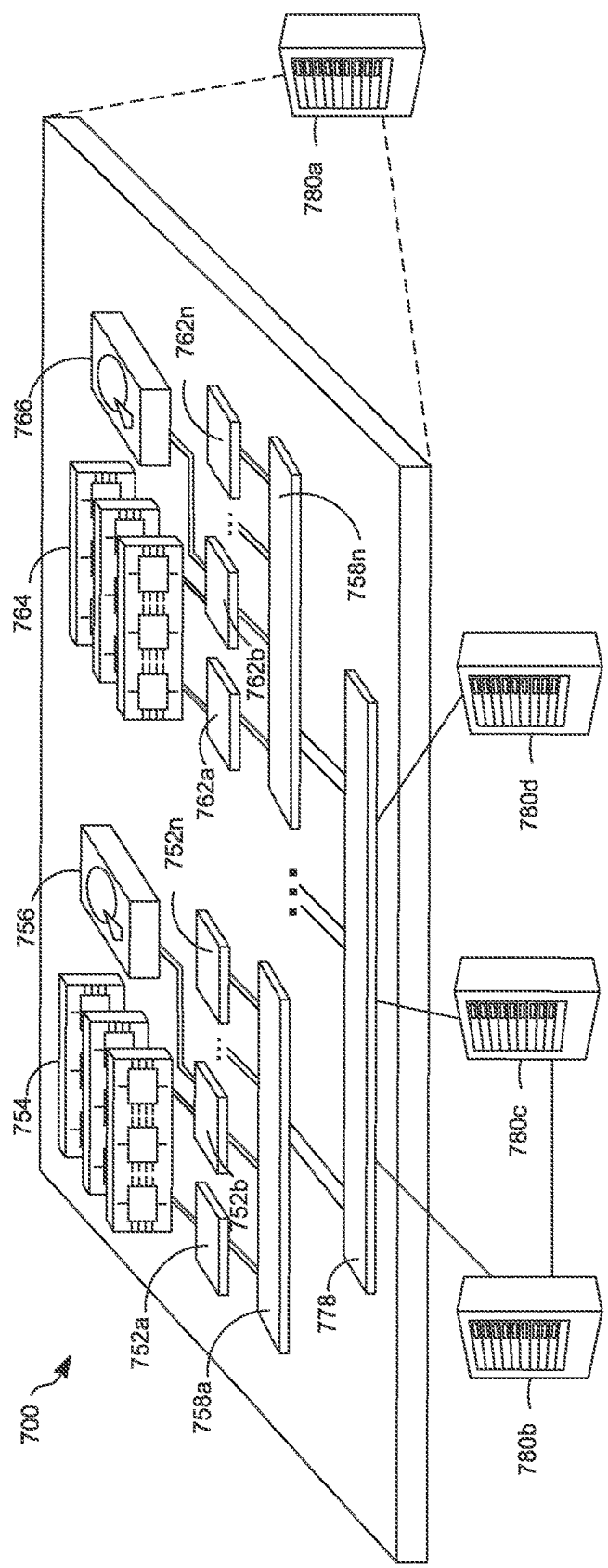
FIG. 6 illustrates an example of a distributed computer device that can be used to implement the described techniques.

FIG. 6 shows an example of a generic computer device 700, which may be computer 120 of FIG. 1A or FIG. 1B, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system may be made up of multiple computing devices 700 communicating with each other. For example, device 780*a* may communicate with devices 780*b*, 780*c*, and 780*d*, and these may collectively be known as computer 120. As another example, computer 120 of FIG. 1 may include one or more computing devices 700. Some of the computing devices may be located geographically close to each other, and others may be located geographically distant. The layout of system 700 is an example only and the system may take on other layouts or configurations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
   receiving, from a repository, a plurality of entities, each of the plurality of entities having a respective value of a quantity that is accurate at a previous time step;
   for each of the plurality of entities, generating associated values of a plurality of parameters at a current time step, the plurality of parameters including at least one of an access rate of that entity from the repository or a likelihood of a change in the respective value of the quantity of that entity;
   selecting a refresh strategy of a plurality of refresh strategies for updating the respective values of the quantity for the plurality of entities according to a refresh policy, the refresh policy including a weight distribution representing a respective likelihood that each of the plurality of refresh strategies is selected, the plurality of refresh strategies including at least two of a uniform strategy, a change-weighted strategy, an access-weighted strategy, or a resource-optimized strategy;
   generating a respective refresh rate for each of the plurality of entities according to the selected refresh strategy, the respective refresh rate for each entity of the plurality of entities being based on the associated values of the plurality of parameters at a sequence of times comprising the previous time step and the current time step;

performing a refresh operation on the repository based on the respective refresh rates for the plurality of entities, the refresh operation being configured to obtain the respective values of the quantity at the current time step; and updating the refresh policy based on a difference between the respective value of the quantity at the previous time step and the respective value of the quantity at the current time step of each of the plurality of entities.

2. The method as in claim 1, wherein selecting the refresh strategy of the plurality of refresh strategies includes:

generating a probability distribution for the refresh strategy over the plurality of refresh strategies, the probability distribution including a respective probability corresponding to each of the plurality of refresh strategies; and performing a random sample of the plurality of refresh strategies according to the probability distribution to produce the selected refresh strategy.

3. The method as in claim 2, wherein generating the probability distribution includes:

performing an average of a weight of the weight distribution and a reciprocal of a number of refresh strategies of the plurality of refresh strategies, the weight corresponding to the refresh strategy.

4. The method as in claim 1, wherein generating the respective refresh rate for each of the plurality of entities according to the selected refresh strategy includes:

for a parameter of the plurality of parameters, generating a respective neural network model corresponding to the parameter; and generating the respective refresh rate for each of the plurality of entities using the respective neural network model corresponding to the parameter.

5. The method as in claim 4, wherein the parameter of the plurality of parameters is the likelihood of a change in the respective value of the quantity of an entity of the plurality of entities, and wherein generating the respective neural network model corresponding to the parameter includes:

training a model based on a set of history features, the set of history features including at least one of a quantity change frequency in a previous time period and a length of time since most recent change.

6. The method as in claim 4, wherein the parameter of the plurality of parameters is the access rate for an entity of the plurality of entities, and wherein generating the respective neural network model corresponding to the parameter includes:

training a model based on a set of history features, the set of history features including at least one of a number of accesses over a previous time period and a number of accesses over the previous time period.

7. The method as in claim 4, wherein generating the respective neural network model corresponding to the parameter includes:

training a model based on metadata, the metadata including at least one of a day of a week for a prediction time, and a characteristic of each of the plurality of entities.

8. The method as in claim 4, wherein:

the repository includes a plurality of offer web pages;

each of the plurality of entities includes an offer web page of the plurality of offer web pages, the offer web page featuring a product offer;

the refresh operation for an entity includes recrawling that web page from a merchant web site;

the plurality of parameters for an entity of the plurality of entities include an impression rate of an offer web page and a click rate of the offer web page;

each of the plurality of entities including a brand identifier of that offer web page, a merchant identifier of that offer web page, and a country identifier of that offer web page, and wherein generating the respective neural network model corresponding to the parameter includes:

training a model based on metadata, the metadata including at least one of the brand identifier, the country identifier, a day of a week for a prediction time, and the merchant identifier.

9. The method as in claim 1, wherein the weight distribution includes a distribution of weights, each of the distribution of weights corresponding to a respective refresh strategy of the plurality of refresh strategies.

10. The method as in claim 9, wherein updating the refresh policy includes:

updating a weight of the distribution of weights at the previous time step to produce the weight at the current time step.

11. A computer program product comprising a nontransitory storage medium, the computer program product including code that, when executed by processing circuitry of a user device configured to perform a method of generating a refresh policy, the method comprising:

receiving, from a repository, a plurality of entities, each of the plurality of entities having a respective value of a quantity that is accurate at a previous time step;

for each of the plurality of entities, generating associated values of a plurality of parameters at a current time step, the plurality of parameters including at least one of an access rate of that entity from the repository or a likelihood of a change in the respective value of the quantity of that entity;

selecting a refresh strategy of a plurality of refresh strategies for updating the respective values of the quantity for the plurality of entities according to a refresh policy, the refresh policy including a weight distribution representing a respective likelihood that each of the plurality of refresh strategies is selected, the plurality of refresh strategies including at least two of a uniform strategy, a change-weighted strategy, an access-weighted strategy, and a resource-optimized strategy;

generating a respective refresh rate for each of the plurality of entities according to the selected refresh strategy, the respective refresh rate for an entity of the plurality of entities being based on the associated values of the plurality of parameters at a sequence of times comprising the previous time step and the current time step;

performing a refresh operation on the repository based on the respective refresh rates for the plurality of entities, the refresh operation being configured to obtain the respective value of the quantity at the current time step; and updating the refresh policy based on a difference between the respective value of the quantity at the previous time step and the respective value of the quantity at the current time step of each of the plurality of entities.

12. The computer program product as in claim 11, wherein each of the plurality of refresh strategies is represented as an arm of a K-armed adversarial bandits algorithm.

13. The computer program product as in claim 11, wherein a sum of the respective refresh rates for the plurality of entities is normalized based on an entity refresh budget constraint.

14. The computer program product as in claim 11, wherein updating the refresh policy includes:
generating, for each of the plurality of entities, a per-entity utility, the per-entity utility including a product of (i) the access rate for that entity, (ii) the respective refresh rate for that entity, and (iii) a binary function that takes a value of one when the value of the quantity of the entity at the previous time step obtained using a refresh strategy of the plurality of refresh strategies is not equal to the value of the quantity of the entity at the current time step, and a value of zero when the value of the quantity of the entity at the previous time step obtained using a refresh strategy of the plurality of refresh strategies is equal to the value of the quantity of the entity at the current time step.

15. The computer program product as in claim 14, wherein updating the refresh policy further includes:
adding the per-entity utility for each of the plurality of entities to a reward parameter at the current time step, the reward parameter indicating a relative usefulness of the refresh strategy at the current time step.

16. An electronic apparatus configured to generate a refresh policy, the electronic apparatus comprising:
memory; and
controlling circuitry coupled to the memory, the controlling circuitry being configured to:
receive, from a repository, a plurality of entities, each of the plurality of entities having a respective value of a quantity that is accurate at a previous time step;
for each of the plurality of entities, generate associated values of a plurality of parameters at a current time step, the plurality of parameters including at least one of an access rate of that entity from the repository or a likelihood of a change in the respective value of the quantity of that entity;
select a refresh strategy of a plurality of refresh strategies for updating the respective values of the quantity for the plurality of entities according to a refresh policy, the refresh policy including a weight distribution representing a respective likelihood that each of the plurality of refresh strategies is selected, the plurality of refresh strategies including at least two of a uniform strategy, a change-weighted strategy, an access-weighted strategy, and a resource-optimized strategy;
generate a respective refresh rate for each of the plurality of entities according to the selected refresh strategy, the respective refresh rate for each entity of the plurality of entities being based on the associated values of the plurality of parameters at a sequence of times comprising the previous time step and the current time step;
perform a refresh operation on the repository based on the respective refresh rates for the plurality of entities, the refresh operation being configured to obtain the respective value of the quantity at the current time step; and
update the refresh policy based on a difference between the respective value of the quantity at the previous time step and the respective value of the quantity at the current time step of each of the plurality of entities.

17. The electronic apparatus as in claim 16, wherein the controlling circuitry configured to select the refresh strategy of the plurality of refresh strategies is further configured to:
generate a probability distribution for the refresh strategy over the plurality of refresh strategies, the probability distribution including a respective probability corresponding to each of the plurality of refresh strategies; and
perform a random sample of the plurality of refresh strategies according to the probability distribution to produce the selected refresh strategy.

18. The electronic apparatus as in claim 17, wherein the controlling circuitry configured to generate the probability distribution is further configured to:
perform an average of a weight of the weight distribution and a reciprocal of a number of refresh strategies of the plurality of refresh strategies, the weight corresponding to the refresh strategy.

* * * * *